United States Patent [19]
Fitzgerald et al.

[11] Patent Number: 5,638,985
[45] Date of Patent: Jun. 17, 1997

[54] VENDING APPARATUS AND METHOD

[75] Inventors: Robert M. Fitzgerald, Norcross; Ward P. Broom, Lilburn, both of Ga.

[73] Assignee: Design & Manufacturing Services, Inc., Norcross, Ga.

[21] Appl. No.: 371,363

[22] Filed: Jan. 11, 1995

[51] Int. Cl.[6] .................................................. B65G 59/00
[52] U.S. Cl. ........................................... 221/125; 221/130
[58] Field of Search .................................. 221/125, 124, 221/92, 130, 131, 2, 7; 312/215

[56] References Cited

U.S. PATENT DOCUMENTS

| | | | |
|---|---|---|---|
| 2,446,807 | 8/1948 | Blair | 221/92 |
| 2,766,906 | 10/1956 | Bookout | 221/92 |
| 2,986,304 | 5/1961 | Barnhart | 221/125 |
| 3,010,608 | 11/1961 | Lyons | 221/125 |
| 3,489,315 | 1/1970 | Craven | 221/125 |
| 4,807,779 | 2/1989 | Clapper | 221/92 |
| 4,967,928 | 11/1990 | Carter | 221/125 |
| 5,385,265 | 1/1995 | Schlamp | 221/131 |

*Primary Examiner*—Kenneth Noland
*Attorney, Agent, or Firm*—Jones & Askew

[57] ABSTRACT

A vending machine for dispensing articles such as scrub garments. The machine defines plural rows of slots for receiving articles, with the rows vertically stacked so that slots in each row form vertical columns with slots on adjacent rows. A separate lockable user door closes each slot level. A slot door assembly between the slots and the user door operates to open a particular slot, and only that slot is accessible when the user door for that level is unlocked and opened. The slot door assembly comprises separate user doors numbering one less than the available slots and slidable to expose any one column of slots at a time. A slot access mechanism moves adjacent the slot doors and extends to engage and displace the slot doors blocking a particular column of slots, so that one slot in that column becomes accessible upon opening a particular user door.

18 Claims, 12 Drawing Sheets

VENDING APPARATUS AND METHOD

FIELD OF THE INVENTION

This invention relates to machines for vending or dispensing discrete articles, and more particularly relates to an apparatus and a method for vending articles such as scrub garments or the like.

BACKGROUND OF THE INVENTION

Scrub garments are uniforms typically worn by doctors, nurses, and other medical workers in hospital operating rooms or other locations where the workers are likely to be in immediate proximity with patients. These scrub garments are hereafter called "scrubs". Scrubs provide an easily-changed launderable barrier between the wearer and the patient, helping to prevent the patient from exposure to germs or infectants on the wearer's body or street clothing, and also helping to protect the wearer's body from direct physical contact with a patient.

Scrubs usually are two-piece garments, consisting of a top or shirt and a bottom or pants. The tops and bottoms are stocked in different sizes to accommodate the needs of individual wearers. Scrub jackets also are worn by doctors and others. Soiled scrubs are collected for laundering and subsequent reuse, but scrubs must be periodically replaced due to wear and tear encountered in normal use as well as the effects of repeated launderings using the high temperatures and detergents required to clean and sterilize the soiled scrubs.

Hospitals normally make scrubs available to doctors and other medical workers at no direct cost to those users. Although each user is supposed to have only a limited number of scrubs at any given time for his or her personal use, some users will hoard scrubs of their size to maintain their own personal reserve. Other users may appropriate extra sets of scrubs for their own personal use, at home or elsewhere outside the hospital. These and other improper uses of scrubs contribute to an unacceptable shrinkage in the inventory of scrubs maintained by the institution for use by authorized persons.

This inventory problem is aggravated by careless handling; where scrubs are stacked for use by anyone, some people will withdraw a scrub from within the pile instead of removing the scrub at the top of the pile. This action often inadvertently dumps one or more clean scrubs from the pile onto the floor. That scrub must be relaundered before use, thereby reducing the remaining useful life of the scrub without the benefit of its use before relaundering. Both the shrinkage of the scrub inventory and the need for relaundering scrubs due to careless handling of increases the cost of providing and maintaining a sufficient supply of scrubs.

Some hospitals try to control the distribution of scrubs by requiring users to check out scrubs from personnel at central locations. Using this approach, each authorized individual is permitted to have no more than a certain number of scrubs in his or her possession at any time. The individual must return soiled scrubs to receive credit for clean scrubs. Although this approach can alleviate the problems mentioned above, it is expensive to maintain. Many hospitals are large enough to require several scrub-dispensing locations throughout the hospital. Furthermore, because hospitals never close, scrub dispensing locations must be staffed around the clock. The direct and indirect labor costs of that staffing add significantly to the overall cost of maintaining an adequate inventory of scrubs.

It has been proposed to overcome the foregoing problems by dispensing scrubs from a vending machine. However, the kinds of vending machines currently available in the art, and the nature of articles such as scrubs, have not made vending machines a practical solution to those problems. Most current vending machines operate on the principle that the items being dispensed are held on a shelf awaiting dispensing. The individual items then are pushed to the edge of the shelf and allowed to fall to the bottom of the machine. A door in the bottom allows access to the dispensed item by the user. The disadvantages of such machines are that they are relatively large in depth because of the space required to store the products on shelves and to allow room for free fall to the bottom of the machine. That free fall space also detracts from volume in the machine that otherwise could hold a larger inventory of scrubs. The overall size of the vending machine is particularly important in hospital applications, because such machines used for vending scrubs may be placed in hallways or other locations not sized to receive conventional vending machines.

Another common kind of vending machine is the so-called pinwheel machine. The items being vended are received in compartments on a pinwheel or carousel within the machine, and each item is given access to an exit door by turning the pinwheel to place the item in front of that door. These machines also have a size disadvantage because at least two dimensions of the machine (for example, depth and width) must be the same to accommodate the round pinwheel.

The nature of scrubs themselves compounds the difficulty of dispensing those goods through a conventional vending machine. Most vending machines dispense discrete articles having a fixed and unchanging physical size or shape. For example, beverage cans or bottles, cigarette packages, and candy bars each have relatively fixed and rigid shapes that allow handling those articles by the mechanism of a vending machine. Scrubs, in contrast with most other discrete articles dispensed by a vending machine, are relatively soft folded garments that are not within a rigid package. Due to the relative flexibility and low mass of scrubs, they are not readily vendable by machines that move or transport the goods from a storage location to an access door.

SUMMARY OF THE INVENTION

Stated in general terms, a vending machine according to the present invention has a number of receptacles or slots for receiving individual articles to be vended. These receptacles preferably are disposed in one or more arrays of receptacles. Receptacle doors allow access to any selected receptacle in any array while blocking access to the remaining receptacles. A user door covers the receptacle doors and all receptacles in an array, preventing access to the receptacle doors and thus to the particular receptacle made accessible through that latter door. To vend the contents of any particular receptacle, the vending machine first operates the receptacle doors to allow access to that receptacle, and then unlocks the user door. A person seeking access to the article may then open the user door for the array and remove the article from the particular receptacle through the receptacle doors. Because the receptacle doors prevent access to all other receptacles in the array, the user cannot remove the scrubs or other goods from any receptacle other than the one initially selected in the vending operation.

Stated in somewhat greater detail, the receptacle doors comprise a plurality of door segments numbering one less than the number of receptacles to be closed by those doors. These door segments are selectably positionable relative to the receptacles so that any one receptacle can remain unblocked while the door segments cover the remaining receptacles. A drive mechanism moves relative to the door segments and selectively engages those segments to separate the receptacle door segments at a desired receptacle. After the receptacle door segments are positioned to unblock or expose the desired receptacle, the vending machine unlocks the user door to allow access to that particular receptacle.

Stated in greater detail, a vending machine according to the present invention may have multiple arrays or levels of receptacles for receiving articles for vending. Each array of receptacles preferably is located in a predetermined relation to the other such arrays, thereby obtaining maximum use of the available space within the enclosure of the vending machine. Where the arrays of receptacles are located aligned parallel to one another, the door segments extend across several arrays to uncover only a single receptacle in each aligned array, and those exposed receptacles form a set one receptacle wide and parallel to the door segments. A separate user door covers each array of receptacles, so that only the unblocked receptacle in a particular array is accessible for vending by unlocking the user door covering that particular array of receptacles.

The apparatus for positioning the receptacle door segments preferably moves along a track located behind the segments. The door segments themselves preferably are mounted for sliding movement. Once the positioning apparatus moves to a particular receptacle position along an array or stack of arrays, that apparatus advances to engage and laterally separate the receptacle doors, thereby uncovering a particular receptacle in each array of receptacles. The positioning apparatus remains engaged with the receptacle doors while the user door is unlocked, so that the user cannot gain access to other receptacles by manually repositioning one or more receptacle doors. Once the user closes the user door, the vending machine relocks that door and may then retract the spreader apparatus and return the receptacle door opening mechanism to a predetermined initial position to await the next vending operation.

The present vending apparatus preferably is controlled by a programmed microprocessor. A memory associated with the processor stores information about the contents of each receptacle and the locations of those receptacles in the arrays. For vending machines intended for dispensing scrubs, that stored information preferably also includes the sizes of the scrub top and bottom placed in each receptacle, the scrub credits allocated for each user and not previously used, and the usage history of each individual obtaining scrubs from the particular vending machine. Each individual can initiate a vending operation by entering his or her user number and a personal identification number in a keypad associated with the machine, or by swiping a personal identification card through a card reader associated with the vending machine. The processor is programmed to determine whether a set of scrubs meeting the need of that individual is in inventory, that is, in a particular receptacle of the vending machine. If so, the processor then drives the receptacle door positioning mechanism to open the door segments at that particular receptacle, and then unlocks the user door for the array containing that receptacle. After the user withdraws the set of scrubs from that receptacle, the processor updates the memory to reflect the now-empty status of that particular receptacle. The processor also updates memory data associated with the particular individual user, to delete one scrub credit from the maximum number of scrubs previously credited for that user. That scrub credit is updated from time to time, preferably as the user returns soiled scrubs. If a user's scrub credit is reduced to zero, that person will not be allowed to obtain further scrubs from the vending machine until the user credit is replenished or increased.

Stated in general terms, it is an object of the present invention to provide an improved apparatus and method for vending articles.

It is another object of the present invention to provide an improved apparatus and method for vending articles having a soft or indefinite configuration.

It is a further object of the present invention to provide a vending apparatus and method using article-receiving receptacles that remain stationary while storing and vending the articles.

Other objects and advantages of the present invention will become apparent from the following description of a preferred embodiment.

DETAILED DESCRIPTION OF PREFERRED EMBODIMENT

Figure 1:
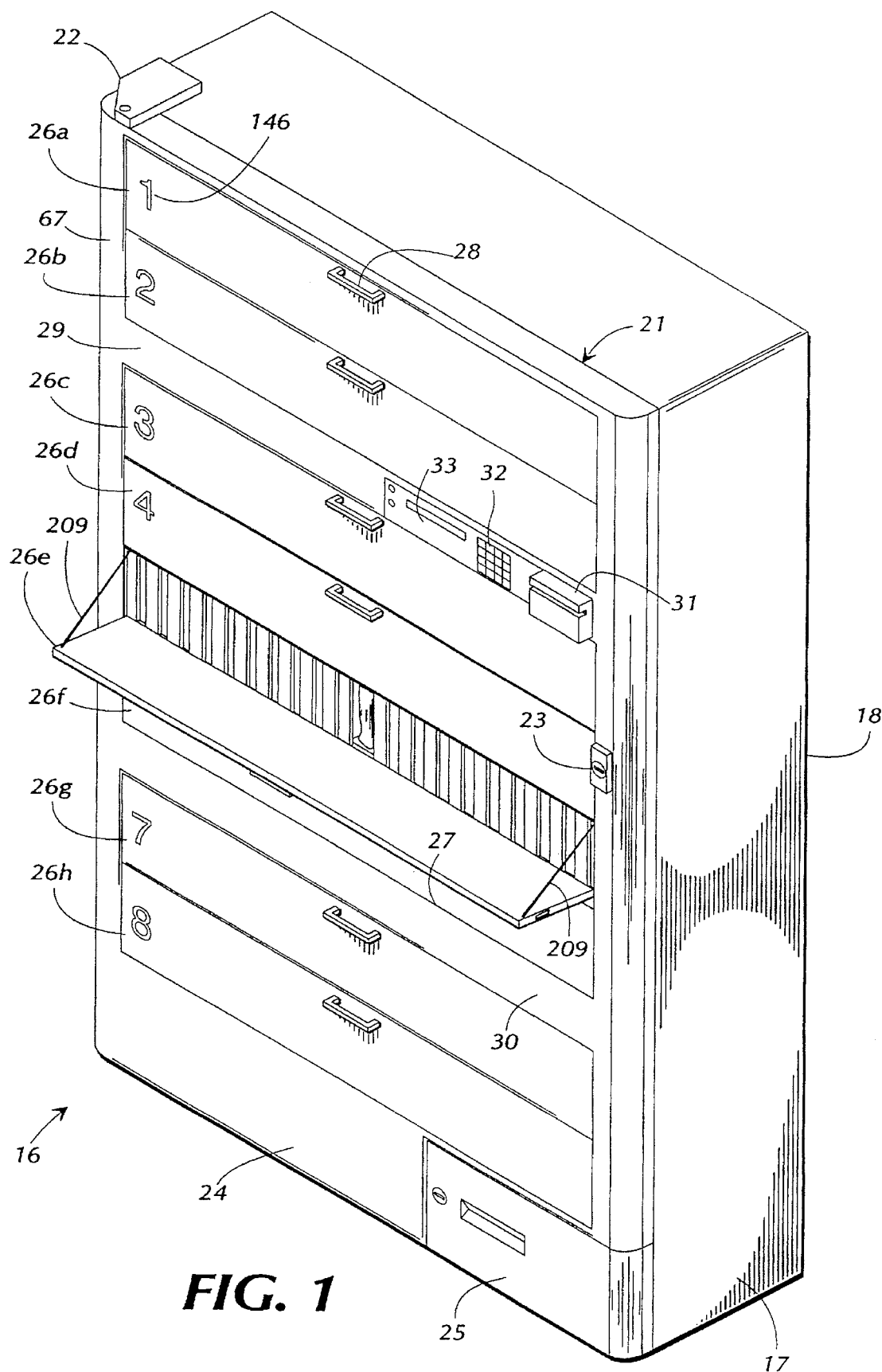
FIG. 1 is a pictorial view of a vending machine according to a preferred embodiment of the present invention.

Turning first to FIG. 1, there is shown generally at 16 a vending machine according to a preferred embodiment of the present invention. This vending machine 16 was designed with the intent of vending scrubs and the machine is described herein in that context. However, it should become apparent to those skilled in the art that the vending machine described herein is readily useful or adaptable for vending other kinds of articles.

The vending machine 16 has an upright housing 17 intended to rest on a floor, and having a back side 18 that preferably fits flush against a wall or other surface (not shown) against which the vending machine is placed when in use. The open front side of the housing 17 is closed by a door assembly 21 hinged as at 22 to one side of the housing. A suitable lock 23 secures the door assembly 21 in closed position relative to the housing 17, allowing only authorized persons to access the interior of the vending machine.

The front of the door assembly 21 contains a number of user doors 26a ... 26h. Each user door is rectangular, with its long dimension extending horizontally across the width of the door assembly 21. The individual user doors 26a ... 26h are hinged along their lower edges 27 to the door assembly 21, so that each user door is selectively openable by pivoting that user door outwardly and downwardly from the vertical plane of the door assembly 21, as illustrated by the open user door 26e. Each user door 26a ... 26h has a handle 28 centrally positioned along the length of the door and located near the upper edge of the door, so that a user can easily open a particular user door when that door is unlocked. Details of the locking mechanism for each user door are set forth below.

The several user doors 26a ... 26h are substantially contiguous to each other in a vertical array, with two exceptions as depicted in FIG. 1. The doors 26b and 26c are vertically separated by a horizontal panel 29 formed by a front portion of the door assembly 21. Similarly, the user doors 26f and 26g are separated by another horizontal panel 30. The vertical separation represented by each panel 29 and 30 is used to accommodate the slot actuating mechanisms contained within the housing 17, as described below. Mounted in the upper panel 29 are the user operating controls including a magnetic card reader 31, a keypad 32 for manual data entry, and a user display 33 containing a digital readout to display selected messages to users. The card reader 31 is preferably of the kind having a slot through which a user can swipe an identification card having a bar code or a magnetic stripe encoded with information identifying the particular user. The construction and operation of such magnetic or bar code card readers, keypads, and digital displays are well known to those skilled in the art and need not be repeated herein.

Below the lowermost user door 26h, the front panel 24 forming part of the door assembly 21 extends less than the full width of the vending machine 16. The remaining portion of that width is normally closed by an auxiliary door 25 that allows access to a storage compartment within the vending machine without opening the door assembly 21 and gaining access to the scrubs stored within the vending machine. A caster wheel 34 (FIG. 2) extends down from the lower edge of the front panel 24 and helps support the weight of the door assembly 21 when open.

Figure 2:
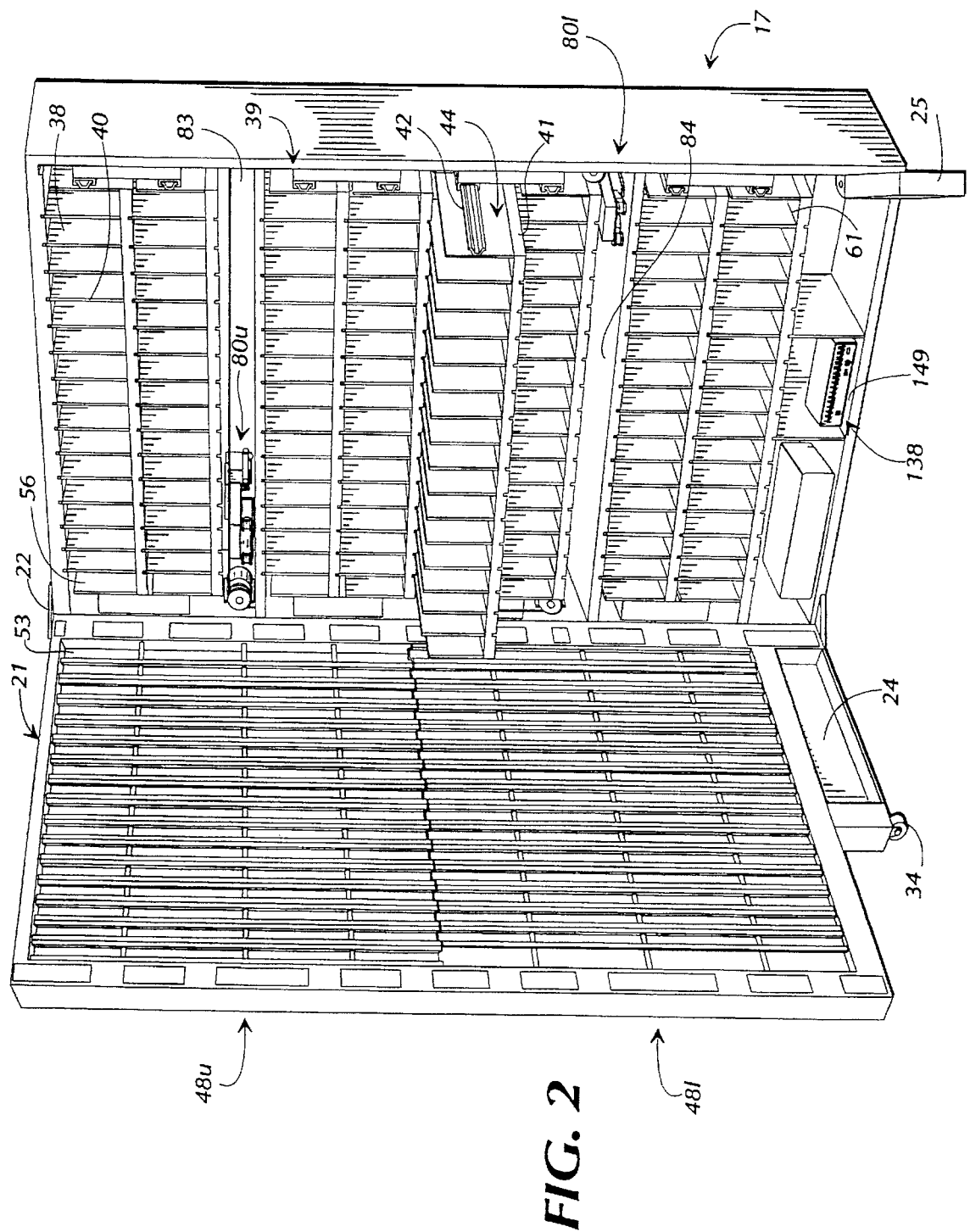
FIG. 2 is a pictorial view of the machine shown in FIG. 1, with the door assembly containing the user doors and the slot doors opened to expose the individual article-receiving slots.

Turning now to FIG. 2, the inside of the housing 17 is seen to contain a plurality of individual receptacles or slots 38 for receiving scrubs or other goods to be vended from the vending machine 16. Individual slots 38 are located side-by-side across the width of the housing 17 to form horizontal levels or arrays 39 of the slots. Each slot 38 in an array 39 is separated from an adjacent slot by the upright dividers 40 attached at their lower edges to a base 41 associated with that array. The base 41 for each array 39 of slots preferably is mounted to the housing 17 of the vending machine by sliding track assemblies as seen at 42, allowing each individual array to slide outwardly from the housing as shown by the array 44, to facilitate stocking the slots with goods.

The vending machine 16 contains eight separate vertically-separated levels or arrays 39 of slots 38 for receiving goods, and each array contains sixteen slots. However, the number of slots in each array, as well as the number of arrays in the vending machine, are design considerations and not critical features of the present invention. Referring back to the exterior of the vending machine as shown in FIG. 1, each user door 26a ... 26h is aligned with a corresponding slot array 39, so that opening a particular user door permits access only to the array 39 of slots located behind that particular user door. The slots of each array 39 are positioned in vertical alignment with corresponding slots on the other arrays, so that any particular slot is in a vertical column of slots one slot wide and extending across plural arrays within the housing 17.

Figure 3:
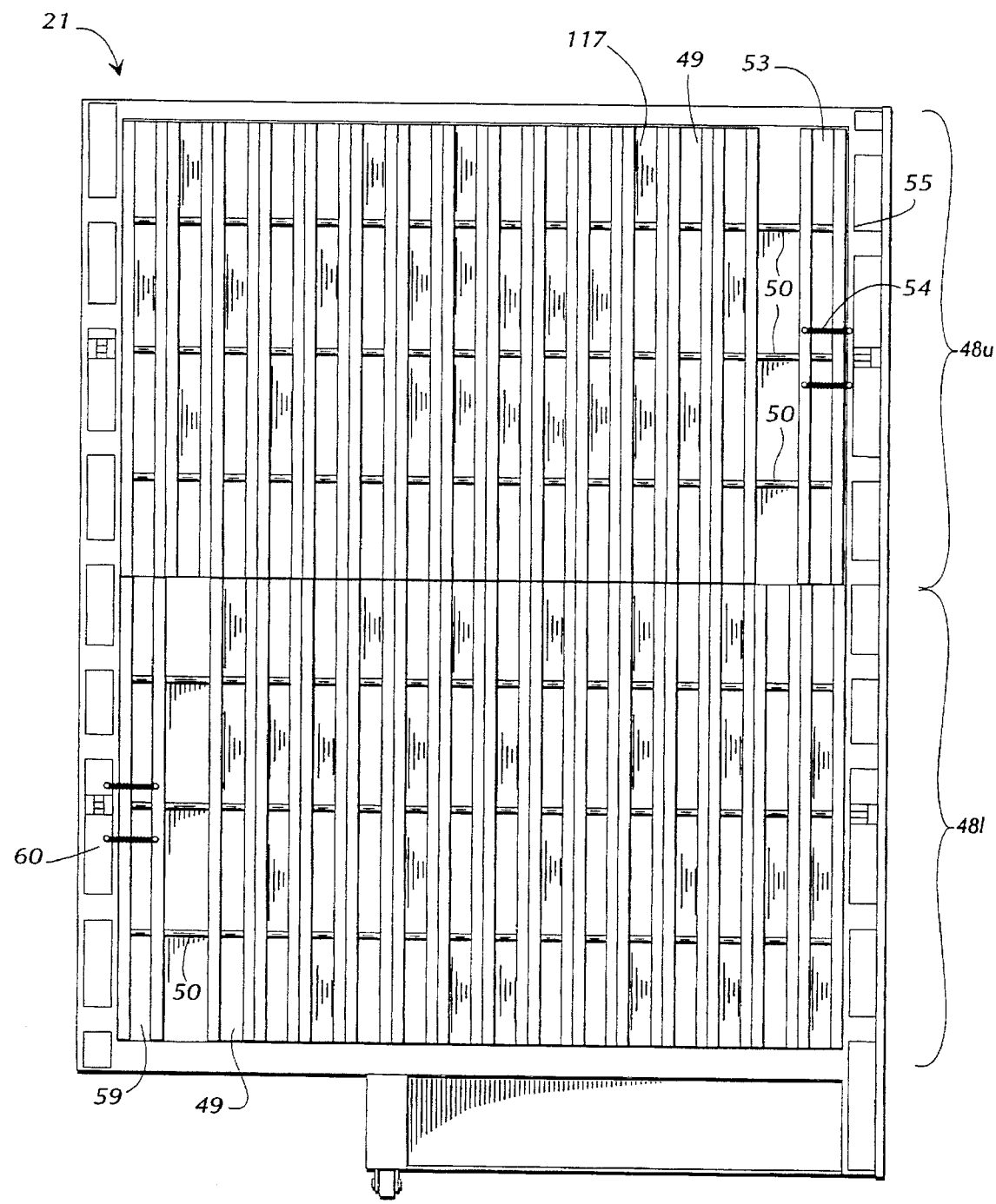
FIG. 3 is a rear elevation view of the door assembly shown in FIG. 2, illustrating the slot doors and the home positions of the slot doors.

The slots 38 making up each column are selectively covered by a slot door arrangement located in the door assembly 21 and interposed between the slots 38 and the user doors 26a ... 26h accessible from the front of the door assembly. Two slot door assemblies, an upper slot door assembly 48U and a lower slot door assembly 48L, are provided as best seen in FIGS. 2 and 3. The upper slot door assembly 48U selectively opens one column of slots 38 in the upper four levels of slot arrays 39, and the lower slot door assembly 48L selectively opens one vertical column of slots in the four lower levels of slot arrays. It should be understood that the vertical column of slots selectively closed or opened by either the upper or lower slot door assemblies 48U or 48L consists of four vertically-stacked slots, in the configuration of the disclosed embodiment. Thus, when an authorized person opens a particular user door such as the uppermost user door 26a, the upper slot door assembly 48U blocks access to all but one of the slots 38 in the uppermost slot array 39 located behind that user door and behind the upper slot door assembly. This combination of selectively-openable user doors and selectively-positionable slot doors permits controlled access by authorized users to the contents of any individual slot 38 in the vending machine, while preventing access to all other slots during a vending operation.

FIG. 3 best shows details of the door assemblies 48U and 48L. Each slot door assembly has a plurality of slot doors 49 mounted on horizontal rails 50 extending across the width of each slot door assembly. The individual slot doors 49 extend vertically in the slot door assemblies 48U; the width of each individual slot door is equal to the width of a slot 38, and the length of each individual slot door is the same as the vertical extent of the four-slot column composed of the upper four slot arrays 39. Those upper four arrays of slots are closed by the upper slot door assembly 48U when the door assembly 21 is closed as shown in FIG. 1. The lower slot door assembly 48L likewise is composed of individual slot doors 49 slidably mounted on rails 50, those slot doors covering the lower four arrays 39 of slots in the vending machine.

The upper and lower slot door assemblies 48U and 48L in the disclosed embodiment each have one less slot door 49 than the number of slots 38 located behind the slot door assembly. In the present embodiment, each slot array 39 contains sixteen slots and the slot door assemblies thus each have fifteen slot doors 49. This allows lateral displacement of the slot doors 49 in each assembly 48U and 48L, so that any selected vertical column of four slots is unblocked by appropriate positioning of the slot doors on the mounting rails 50.

The first slot door 53 of the upper slot door assembly 48U is spring-loaded by the springs 54 to engage the adjacent side frame 55 of the door assembly 21. This first slot door 53 thus always covers the left-most column 56 of slots in the upper four levels of arrays 39, as seen when the door assembly 21 is closed (FIG. 3 shows the back side of the opened door assembly). The fight-most slot door 59 of the lower assembly 48U (at the left, in FIG. 3) likewise is biased by the springs 60 to a position that closes the fight-most column 61 of four slots in the four lower levels of slot arrays 39. These spring-biased positions of the first slot doors 53 and 59 constitute home positions of those doors. The significance of those home positions is explained below.

Figure 4:
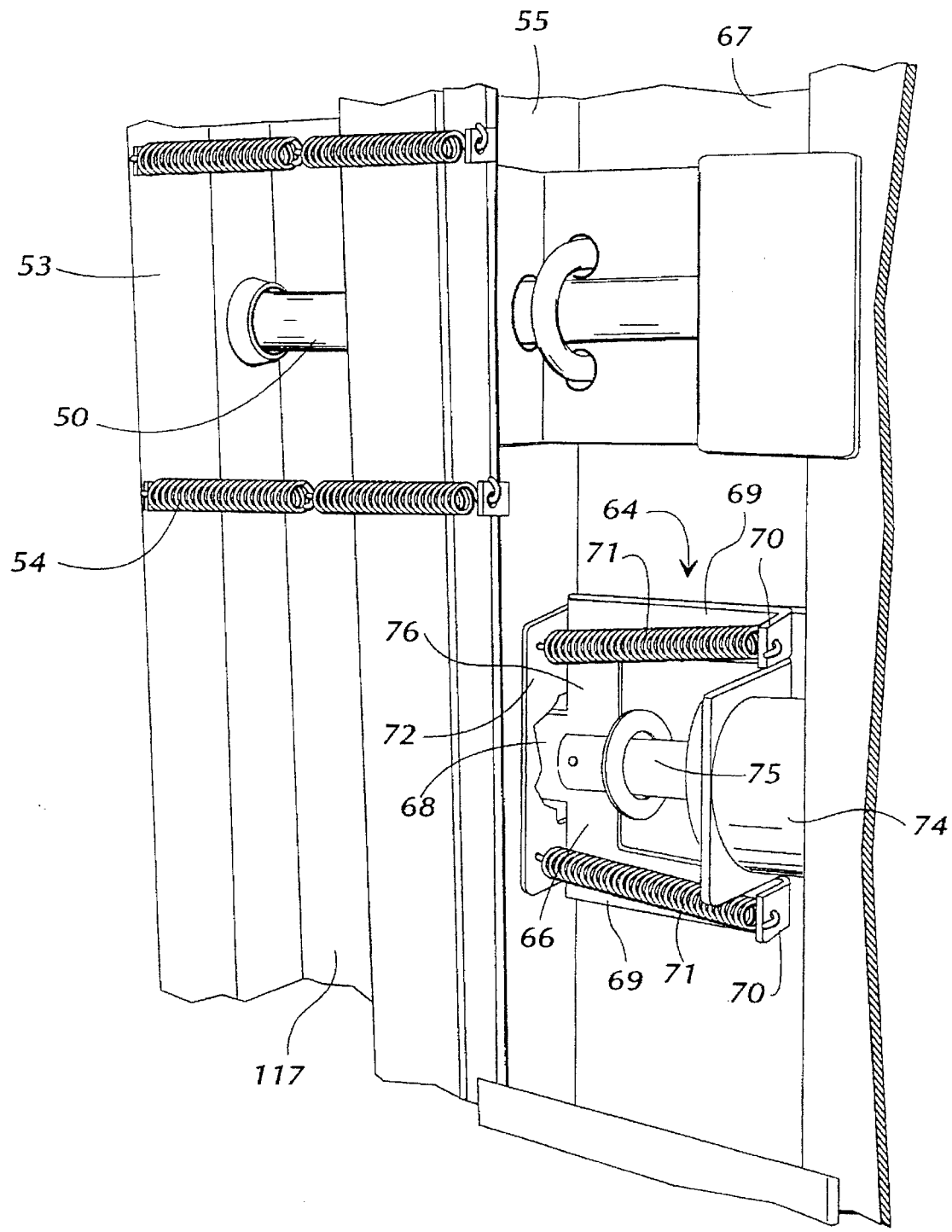
FIG. 4 is a fragmentary pictorial view showing the locking mechanism associated with a typical user door.

The vertical slot doors 49 making up the upper and lower slot door assemblies are mounted in the door assembly 21 behind the horizontal user doors 26a ... 26h, accessible from the front of the door assembly. As previously mentioned, those user doors are normally locked to prevent unauthorized access. The door assembly 21 also includes the separate lock mechanisms for each user door 26a ... 26h. These lock mechanisms are located along the right side (as seen in FIG. 2) of the door assembly 21, and one such lock assembly 64 is detailed in FIG. 4. That lock assembly 64 is located in the door assembly to the right of the side frame 55 against which the first slot door 53 is biased to its home position. The lock assembly 64 includes an actuator plate 66 mounted for sliding movement behind the vertical side panel 67 extending along one end of the user doors 26a ... 26h (not visible in FIG. 4). The actuator plate 66 has somewhat the shape of a Y laid on its side, with a central part of the actuator plate forming a tang 68 extending outwardly from one end opposite the two parallel spaced-apart arms 69. The outer end 70 of each arm 69 is bent outwardly from the plane of the actuator plate, and those outer ends engage one end of corresponding tension springs 71. The other ends of the spring 71 are fastened to a stationary mounting plate 72 secured to the side frame 55 of the door assembly. The springs 71 thus bias the actuator plate 66 leftwardly, as seen in FIG. 4, moving the tang 68 of the actuator plate to engage a mating slot (not shown) in one of the user doors 26a ... 26h, thereby locking that user door in the closed position shown in FIG. 1.

The lock assembly 64 includes an electrical solenoid 74 having an armature 75 connected to the central portion 76 of the actuator plate 66. When the solenoid 74 is actuated, the armature 75 withdraws the actuator plate 76 against the force of the springs 71, thereby withdrawing the tang 68 from its mating slot in the particular user door. That user door thus is unlocked and may be swung open, allowing the user to remove a scrub or other article from the particular slot 36 uncovered by the slot door assembly 48U or 48L located behind that particular user door.

Figure 4A:
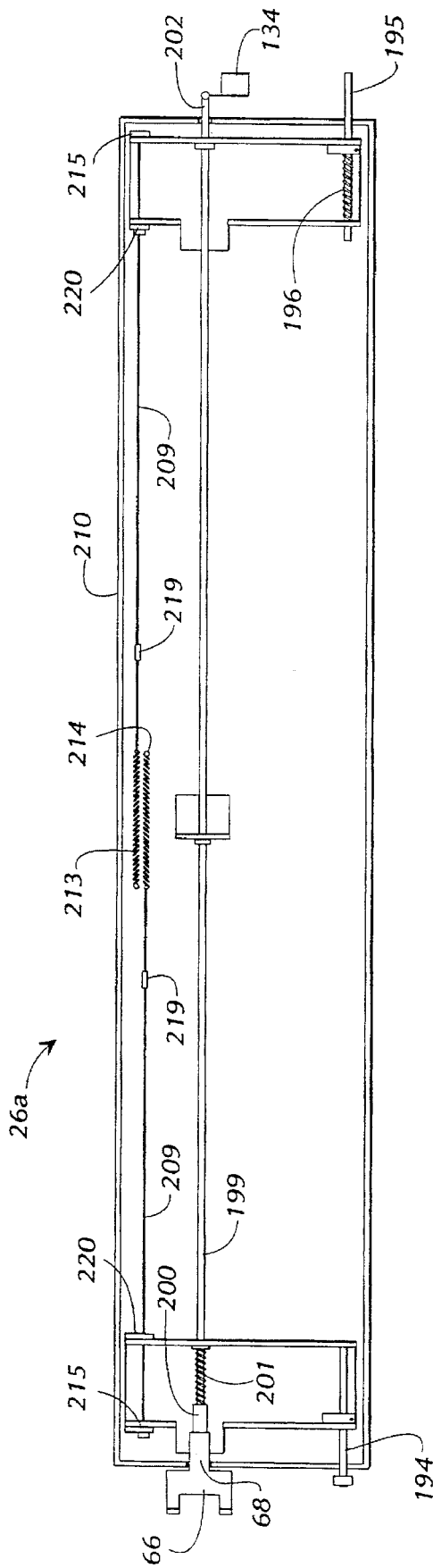
FIG. 4A is an elevation view showing the back side of a typical user door in e preferred embodiment.
Figure 4C:
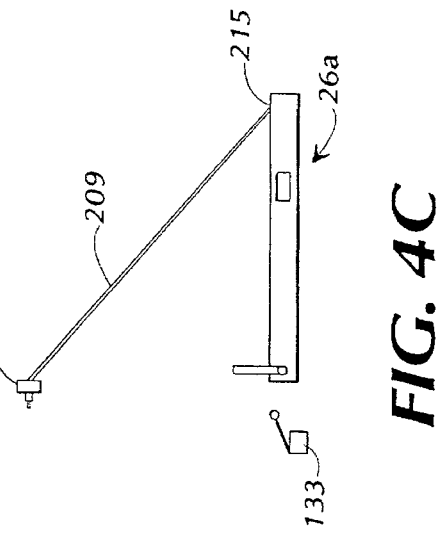
FIG. 4C is an end view as in FIG. 4B, with the user door open.
Figure 4B:
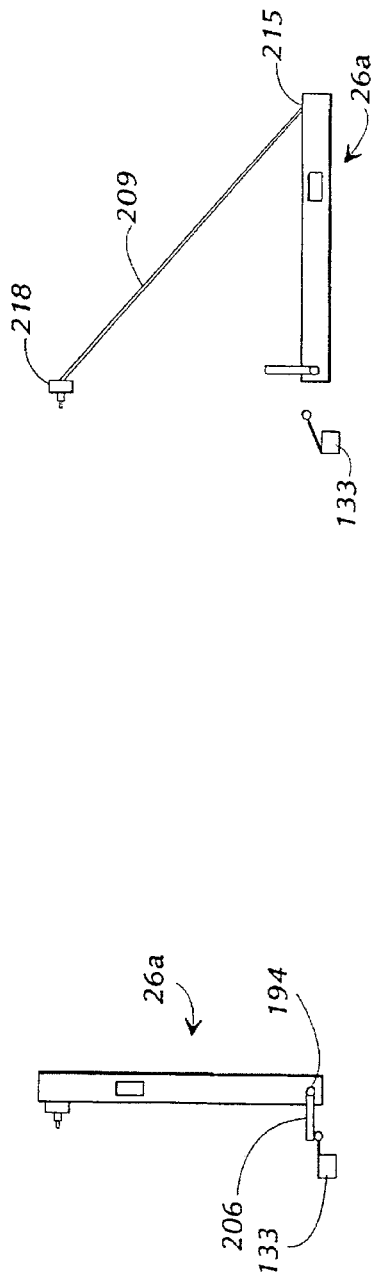
FIG. 4B is an end view taken from the left side of FIG. 4A, with the user door closed.

FIGS. 4A, 4B, and 4C show details of a typical user door 26a. That door is pivotably attached to the door assembly 21 by the pivot rods 194 and 195 extending outwardly from the ends of the user door for engaging openings in the adjacent structure of the door assembly. A compression spring 196 at the inner end of the pivot rod 195 urges that pivot rod outwardly to engage the door assembly, and permits pressing the pivot rod inwardly for installing and removing the user door. The pivot rod 194 is fixed with the user door 26a and rotates as that user door is opened or closed. A finger 206 is attached to the pivot rod 194 and extends radially outwardly therefrom, as best seen in FIGS. 4B and 4C. That finger 206 is positioned to selectively engage the user-door closure switch 133 when the user door 26a is closed (FIG. 4B) and to disengage that switch when the user door is opened (FIG. 4C).

A lock rod 199 extends substantially the length of the user door 26a. The lock rod 199 is supported with one end 200 positioned for engagement by the tang 68 of the actuator plate 66 for the lock assembly, and a spring 201 at that end urges the lock rod toward the tang. The other end 202 of the lock rod extends beyond the opposite end of the user door 26a and selectively engages the user-door frame comprised by the door assembly 21. The user door lock switch 134 is positioned within the door assembly 21 for engagement by the other end 202 of the lock rod 199, when the lock rod is pushed to the right (as viewed in FIG. 4A) by the locking mechanism 64 in opposition to the force of the spring 201.

A pair of tension cables 209 attaches between each user door and the door assembly 21 of the vending machine. Those tension cables are located near the upper longitudinal side 210 of the user door and extend longitudinally within the user door. A tension spring 213 attaches to an inner end of each tension cable, with the free end of each tension spring anchored to the user door at 214. The tension cables 209 extend from the free ends of the springs 213 to the respective cable guide bushings 215 at opposite ends of the user door near the upper side 210 thereof. The tension cables 209 pass through those guide bushings 215, and from there extend outwardly of the user door and upwardly to an outer end 218 secured to the door assembly 21 of the vending machine.

As seen in FIG. 4A, a cable stop collar 219 is affixed to each tension cable 209 a short distance beyond the free end of each tension spring 213. The locations of these stop collars on the tension cables are chosen so that the stop collars engage the cable guide bushings 220, located a short distance inwardly from each end of the user doors, when a predetermined extent of the tension cables has passed through the guide bushings 215.

The slot doors 49 of the upper and lower slot door assemblies 48U and 48L are respectively positioned by the upper slot access mechanism (SAM) 80U and the lower SAM 80L, best seen in FIGS. 2 and 5–8. The upper and lower SAMs 80U and 80L are supported for movement along the horizontal tracks 81 and 82, best seen in FIG. 5, extending across the width of the housing 17. The upper track 81 is located in the lateral space 83 separating the second and third levels of slot arrays, counting from the top of the housing 17. The lower SAM 80L likewise is situated in the lateral space 84 separating the sixth and seventh levels of slot arrays. The SAMs and their respective support tracks do not interfere with the pull-out extension of the slot arrays, as illustrated by the array 44. A single drive cable 87 extends along the SAM tracks 81 and 82 and connects to each SAM. Pulleys 88 at each end of the tracks 81 and 82 support the drive cable 87 in a generally rectangular path, with vertical portions 87a, 87b of the drive cable at the left and right sides of the housing 17 extending between the upper and lower tracks 81 and 82. The cable 87 loops around a drive wheel 89 connected to a motor 90 mounted at one side of the housing 17.

Figure 5:
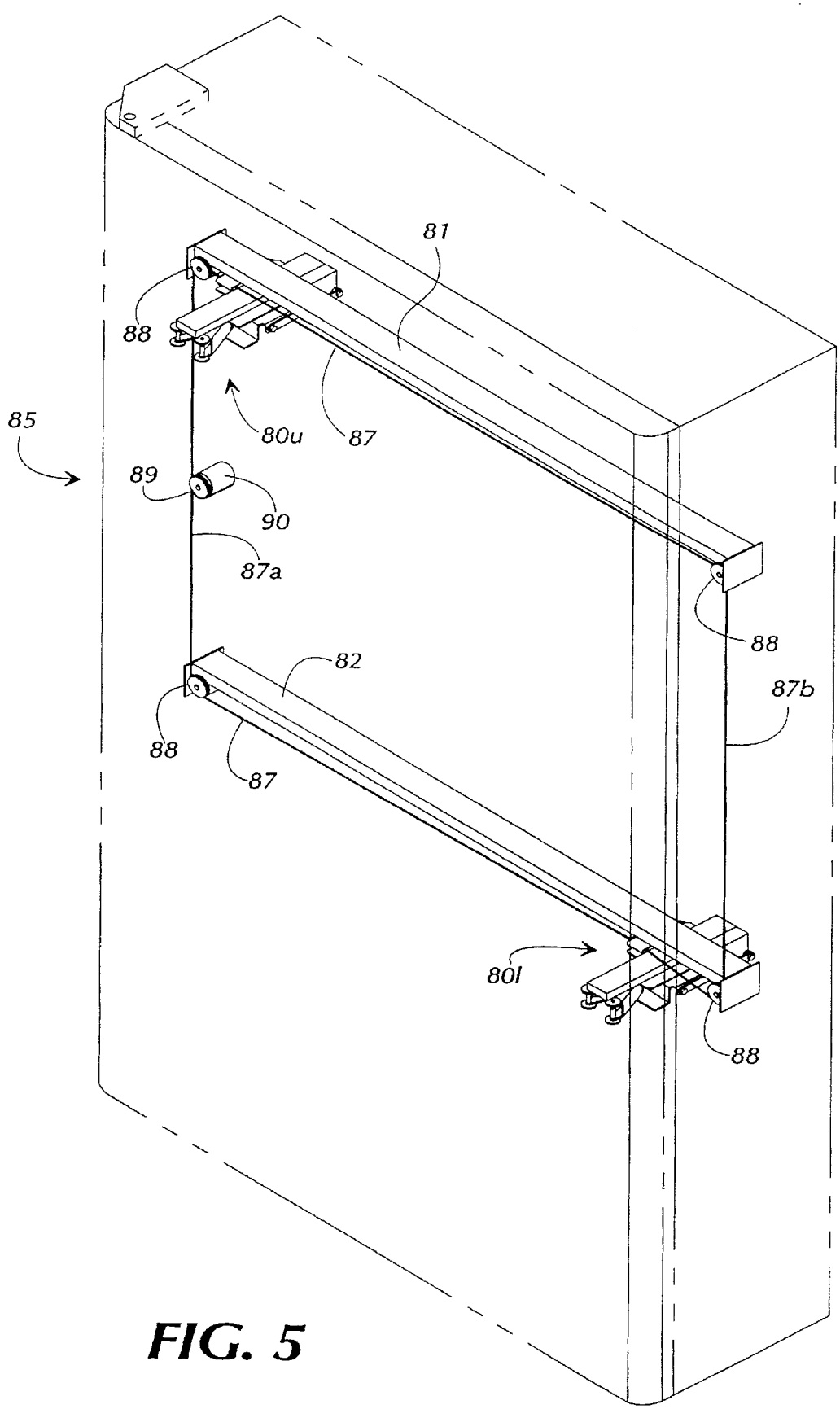
FIG. 5 is a pictorial view illustrating the drive mechanism for positioning the slot access mechanisms of the disclosed embodiment.

The upper SAM 80U and the lower SAM 80L are laterally offset from each other on their respective tracks 81 and 82, as seen in FIG. 5. In that position, each SAM is located adjacent the respective home position of the first slot doors 53 and 59, respectively, in the upper and lower slot door assemblies 48U and 48L as seen in FIG. 3. By driving the motor 90 to move the drive cable 87 in the clockwise direction as viewed in FIG. 5, that cable advances the upper SAM 80U along its track 81 toward the fight side of the housing. At the same time, leftward movement of the cable 87 along the lower SAM track 82 moves the lower SAM 80L toward the left side of the housing. Counterclockwise movement of the drive cable 87 moves the SAMs in the opposite directions. It should now be understood that the SAMs are positionable adjacent any particular slot door 49 by operating the motor 90 until the appropriate SAM is moved into position adjacent and immediately behind that slot door.

To track movement of the SAMs on their tracks, one of those tracks 81 (FIG. 6) has a slot plate 94 containing location slots 95 corresponding in number to the article-receiving slots 38 in a slot array 39. Each location slot 95 is located on the slot plate 94 corresponding to the stopping position of the SAMs at the slot door for that particular slot. These location slots 95 are sensed by an optical sensor 97 laterally movable with the upper SAM 80U as the drive cable 87 moves that SAM in either direction along the track 81. Because the two SAMs 80U and 80L are linked together by the drive cable and move in unison, only a single slot plate 94 and slot sensor 97 are required. The slot sensor 97 produces an electrical signal each time the SAM 80U passes a location slot 95 as the SAM moves away from its predetermined home location. By counting those slot-detection signals, the operating system associated with the vending machine 16 knows the location of the SAM relative to its home position and thus can stop the drive motor 90 when the SAMs arrive at a particular slot located a predetermined number of slots away from the home position.

Figure 6:
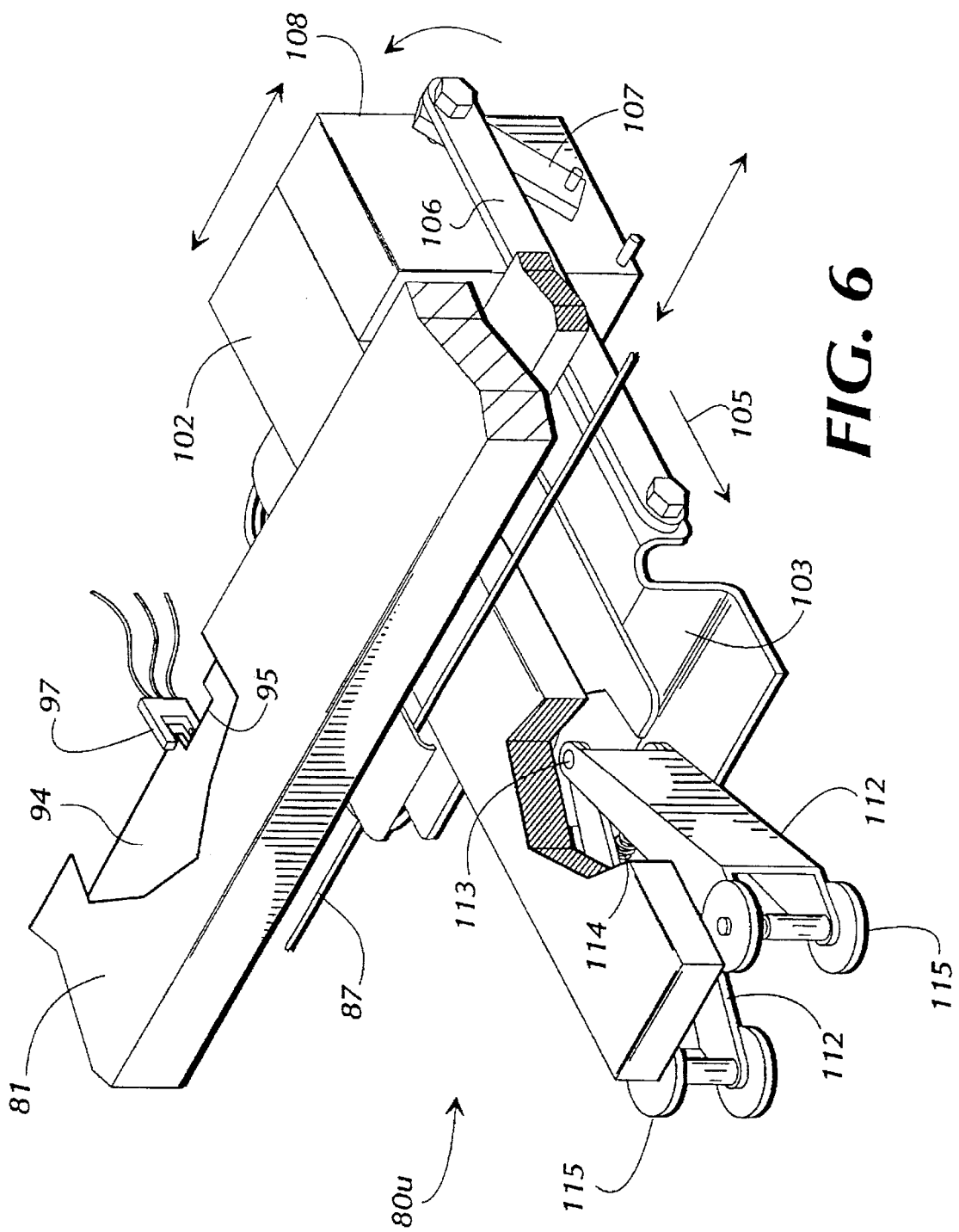
FIG. 6 is an enlarged fragmentary view, partially broken away for illustrative purposes, showing details of a slot access mechanism used in the present vending machine.
Figure 7:
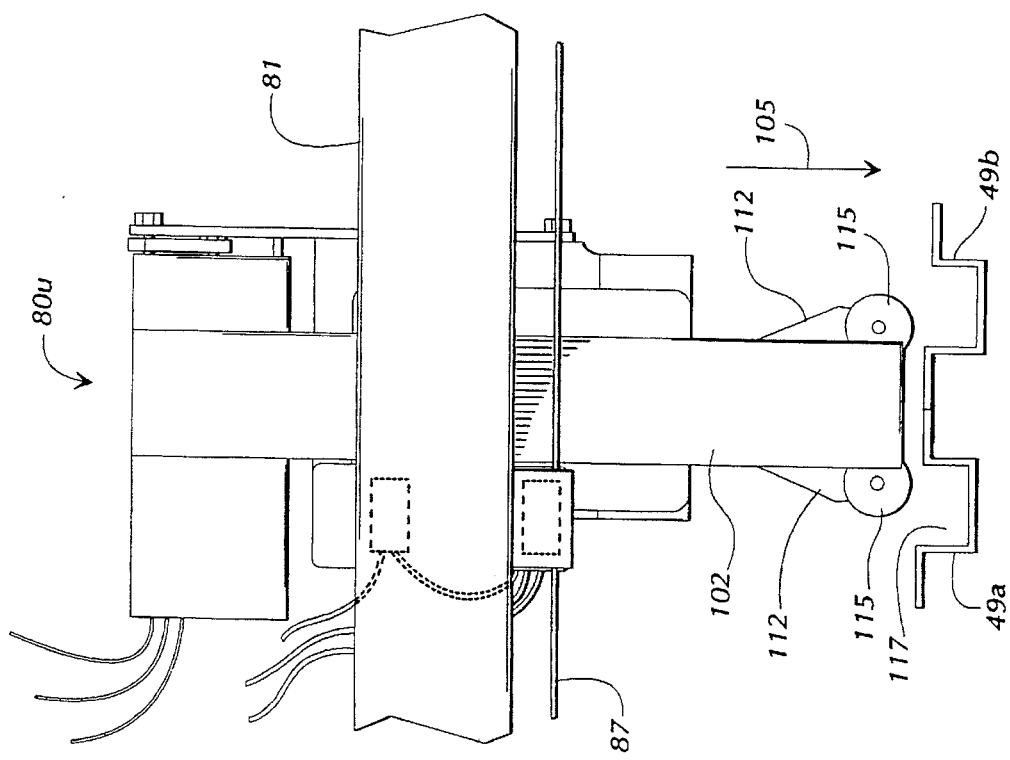

Turning now to FIG. 6, the upper SAM 80U has a cross beam 102 suspended beneath the upper track 81 for movement along that track, as previously mentioned. That cross beam and the following description of the upper SAM 80U also applies to the lower SAM 80L unless the context indicates otherwise. The cross beam 102 is horizontal and extends perpendicular to the track 81, and supports an arm assembly 103 for a limited extent of movement in a direction parallel to the cross beam. This movement of the arm assembly 103 moves that arm assembly between the retracted position shown in FIGS. 6 and 7, and the extended position shown in FIG. 8. The motion arrow 105, FIGS. 6 and 7, represent movement of the arm assembly 103 from retracted to extended positions. A link 106 connects between the arm assembly 103 and a crank arm 107 of a powered actuator 108 carried by the cross beam 102, to extend and retract the arm assembly.

The arm assembly 103 of each SAM, at the end facing the respective upper or lower slot door assemblies 48U and 48L, supports a pair of arms 112 pivotably attached at the vertical axis 113 to the arm assembly. A pair of rollers 115 is pivotably mounted at the end of each arm 112 remote from the pivot 113. The two arms 112 are mounted on the cross beam 102 so that, at rest, each arm defines an acute angle out from the longitudinal axis of the cross beam 102. The arms 112 are spring-biased together by the spring 114 to the rest position shown in FIG. 7.

Figure 8:
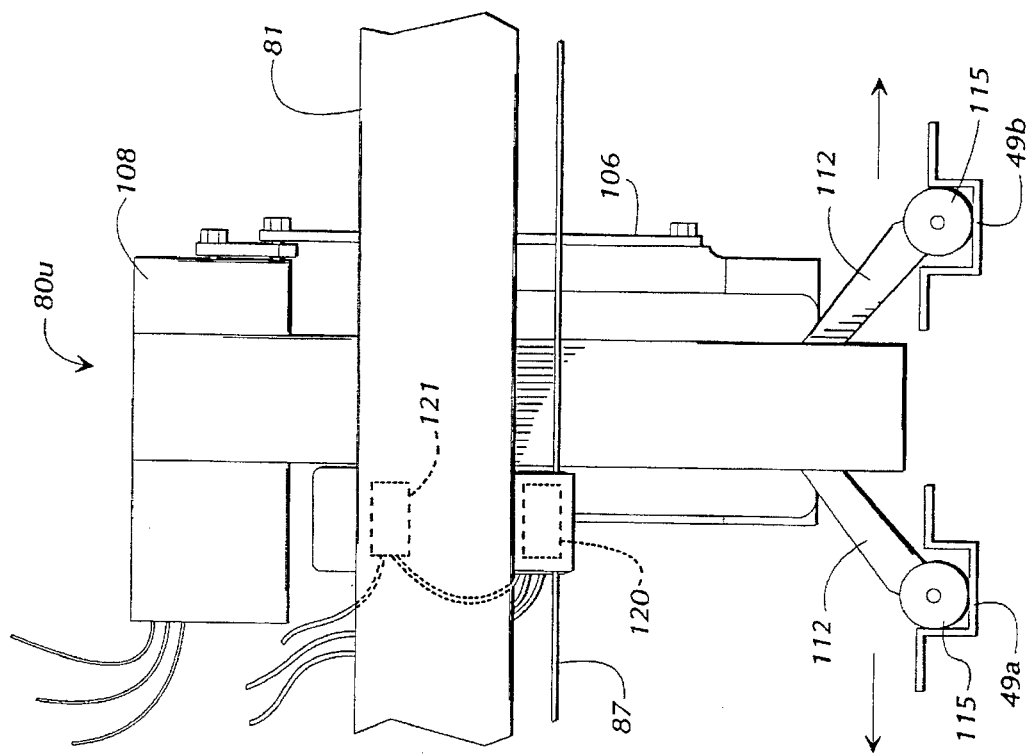
FIGS. 7 and 8 are fragmentary top plan views showing the slot access mechanism in the retracted and extending positions, respectively.

Reverting to the slot doors 49, each slot door in transverse section (as shown in FIGS. 7 and 8) has a central portion depressed to form a channel 117. This channel extends the length of each slot door 49, as seen in FIG. 3. The length of each arm 112 on the SAMs, and the included angle between those two arms at rest, are chosen so that the rollers 115 at the ends of the arms are substantially aligned with the channels 117 of any two adjacent closed slot doors, such as the slot doors 49a and 49b (FIGS. 7 and 8) when the SAM is positioned in alignment with a particular column of slots 38 normally closed by those slot doors. With the SAM thus positioned, operating the actuator 108 to extend the arm assembly 103 in the direction shown by the motion arrow 105 advances the arms 112 so that the rollers 115 enter the channels 117 of the two adjacent slot doors 49a and 49b. As the arm assembly 103 continues to advance, the rollers 115 exert a lateral component of force on those slot doors. That lateral force slides the slot doors 49a and 49b apart on the supporting rails 50 (FIG. 3) to the position as shown in FIG. 8, until those two slot doors are separated by a distance substantially the same as the width of an article-receiving slot 38. An advancement limit switch 120 (FIG. 8) carried by the SAM 80U operates to shut off the actuator 108 and produce a signal when the arm assembly 103 and the arms 112 are fully extended. Another limit switch 121 carried by the SAM 80U likewise operates to shut off the actuator 108 and produce a signal when the arm assembly 103 is returned to the fully-retracted position shown in FIGS. 6 and 7.

Figure 9:
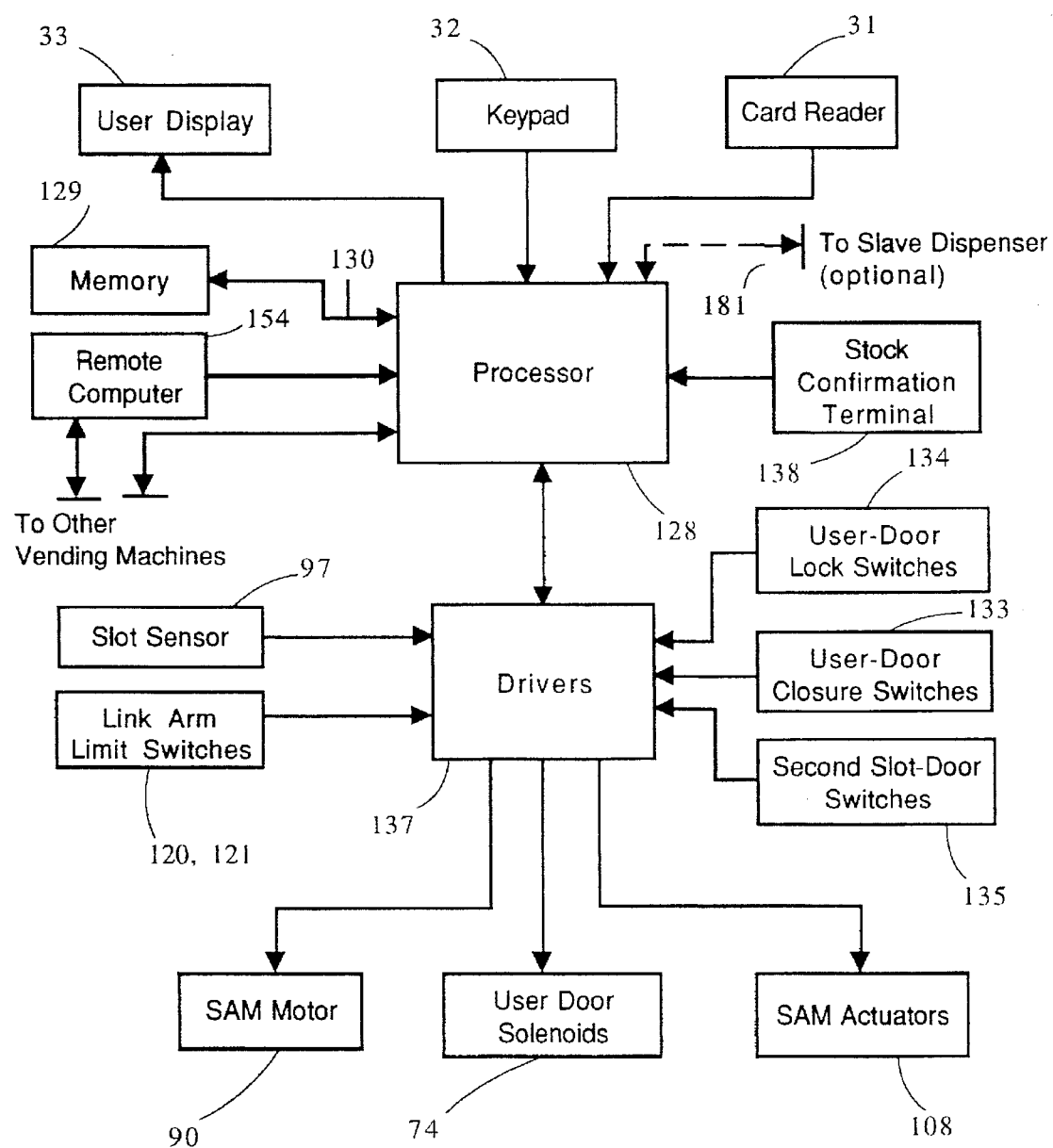
FIG. 9 is a block diagram of the operating control system in the disclosed embodiment.

A programmed microprocessor 128 (FIG. 9) and drivers 137 control the operation of the motive elements in the vending machine 16. This processor is connected to a memory 129 by a bus 130, and it will be understood that both the memory and the microprocessor in practice preferably are mounted on a single processor board located within the housing 17 of the vending machine. The processor is connected to receive input signals from the card reader 31 and the keypad 32 mounted on the door assembly 21, and to display appropriate programmed messages on the user display 33. The processor 128 supplies signals to device drivers collectively indicated at 137 in FIG. 9. These drivers, which are mounted on a common driver board in the preferred embodiment, are driven by appropriate signals from the processor 128. The nature and operation of device drivers, microprocessors, and related circuit elements are well known in the art, and those devices are not further described herein. The driver board includes a microprocessor in the preferred embodiment and also receives signals from the slot sensor 97, and counts the number of slots detected from the home position of the SAMs to determine the SAM position relative to that home position.

Also connected to provide inputs to the driver 137 are the user-door closure switches collectively indicated by the block 133, and the user-door lock switches collectively indicated at 134. A separate user-door closure switch 133 is mounted in the door assembly 21 to sense the closure of a particular user door and send the driver 137 a signal corresponding to that closure. A separate user-door lock switch 134 is associated with the lock assembly 64 for each user door 26a . . . 26h. Each lock switch 134 sends an appropriate signal to the driver 137 whenever that user door is actually locked by its corresponding lock assembly 64. The drivers thus are responsive to separate signals indicating the closure and lock status of each individual user door. The drivers 137 also receive signals from the link arm limit switches 120, 121 of each SAM, indicating the extended and retracted positions of the SAMs. Separate switches 135 associated with the upper and lower second slot doors adjacent to the first slot doors 53 and 59 signal the drivers when either of those second slot doors is displaced from their respective reset positions as described below. The SAM drive motor 90, the solenoids 74 with the lock assemblies 64 for the user doors, and the link arm actuators 108 each are powered by signals from device drivers collectively indicated at 137 in FIG. 9.

The vending machine 17 is loaded by unlocking and opening the door assembly 21 to expose the slots 38 within the machine. Each slot preferably is visually marked, such as by color coding, to tell the person doing the loading which scrub size belongs in that slot. It is preferred to vend a set of scrubs, consisting of a top and a bottom, from some or all slots 38, so that a person using the vending machine can obtain a complete set of scrubs with a single vending operation. For example, the first sixteen slots, making up the entire uppermost array 39, could contain large tops and large bottoms, the first two slots on the next array might be large tops with medium bottoms, and so on.

Figure 10:
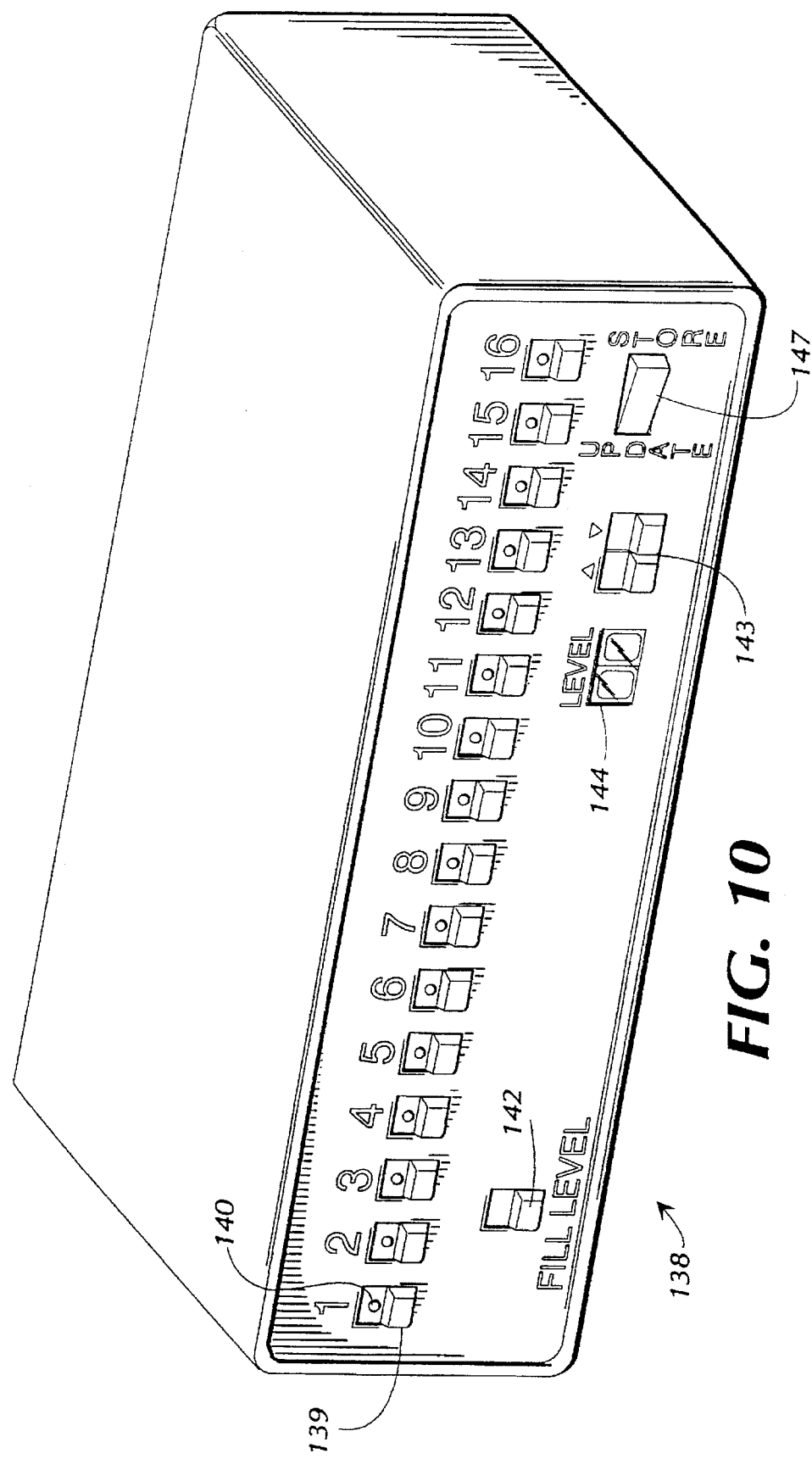
FIG. 10 is a pictorial view showing the stock confirmation terminal forming part of the disclosed embodiment.

Scrubs of the appropriate sizes are loaded in the slots 38. Not all slots must contain scrubs; if clean scrubs are not available in the size combination assigned for each empty slot, those slots remain empty and that information is entered in the stock confirmation terminal 138, FIG. 10, which is connected to the processor 128 of the vending machine and stowed in a shelf below the bottom level of slots when not used.

The front panel of the stock confirmation terminal 138 contains a horizontal array of pushbutton switches 139 corresponding in number and location to the slots 38 on each horizontal array 39 of the vending machine. Because each slot array in the preferred embodiment contains sixteen slots, the switch array of the terminal 138 likewise contains sixteen switches 139. Those switches preferably are numbered on the terminal 138 in a manner corresponding with visible numbers on the slots 38 of the vending machine. An LED 140 is associated with each switch 139, and is controlled to toggle on or off as the corresponding switch likewise is toggled by the operator. The stock confirmation terminal also includes a fill level switch 142 operative to simultaneously toggle on or off all sixteen switches 139 and the corresponding LEDs 140. The fill level 142 thus is a convenience to a person stocking the vending machine, as will be described below.

The stock confirmation terminal 138 also includes a pair of up-down switches 143, each being a momentary-contact push switch operative to select an upper or lower level of array 39 in the vending machine. The level indicator display 144 operates to provide the operator with a visual display indicating the selected level. The level information on the display 144 correlates with labels appearing on the individual arrays 39 within the housing 17, as well as with the level numbers 146 (FIG. 1) displayed on the outside of each user door 26a . . . 26h.

Once the operator has filled the slots 38 with scrubs available for the size combinations previously assigned for those slots, the operator uses the stock confirmation terminal 138 to program into the processor memory 129 the full/empty status of each slot. To accomplish this, the operator first switches the update-store switch 147 to the "Update" mode, which enables the terminal to communicate through the processor 128 to update the inventory database stored in the memory 129. The operator then uses the level switches 143 to select the first level, as indicated by the display 144, for data entry. If the operator selects the first or uppermost level, in the preferred embodiment, that corresponding number appears in the display 144. The operator next operates each switch 139 of the terminal to indicate the full (LED 140 illuminated) or empty (LED off) status of the corresponding slots at the selected level. If each slot at the selected level is either filled or empty, the operator can simply press the fill level switch 142 to toggle on or off all the switches 139 for that level. If all but a few slots 138 of the selected level are either filled or empty, the operator can use the fill level switch 142 to toggle all the switches 139 to that status, and can then operate individual switches 139 to indicate the opposite status of the few remaining slots at that level.

The operator repeats the foregoing procedure for each level (corresponding to the arrays 39) of the vending machine. The level switches 143 are operated to select the next desired level, shown by the display 144, for data entry, after which the individual slot switches 139 or the fill level switch 142 are manipulated to select the full/empty status of the individual slots at that next level. It will be understood that by operating a particular slot switch 139 in the "on" or "off" position, the processor 128 updates the database in memory to receive and store a signal corresponding to the filled/empty status of a corresponding particular slot 38. By manipulating the switches of the terminal 138 as described herein, the database is updated with information corresponding to the inventory of scrubs available for vending by the vending machine. After updating the status of each slot, the operator changes the update-store switch to "store" which disables all other controls on the stock confirmation terminal 138 and signals the processor that loading the vending machine is completed. In response to that signal, the processor 128 updates the database in memory and also sends the updated information to the central computer. This action ensures that the operator cannot inadvertently change the position of a slot switch while stowing the stock confirmation terminal in the shelf 149 (FIG. 2) at the bottom of the housing 17.

Figure 11A:
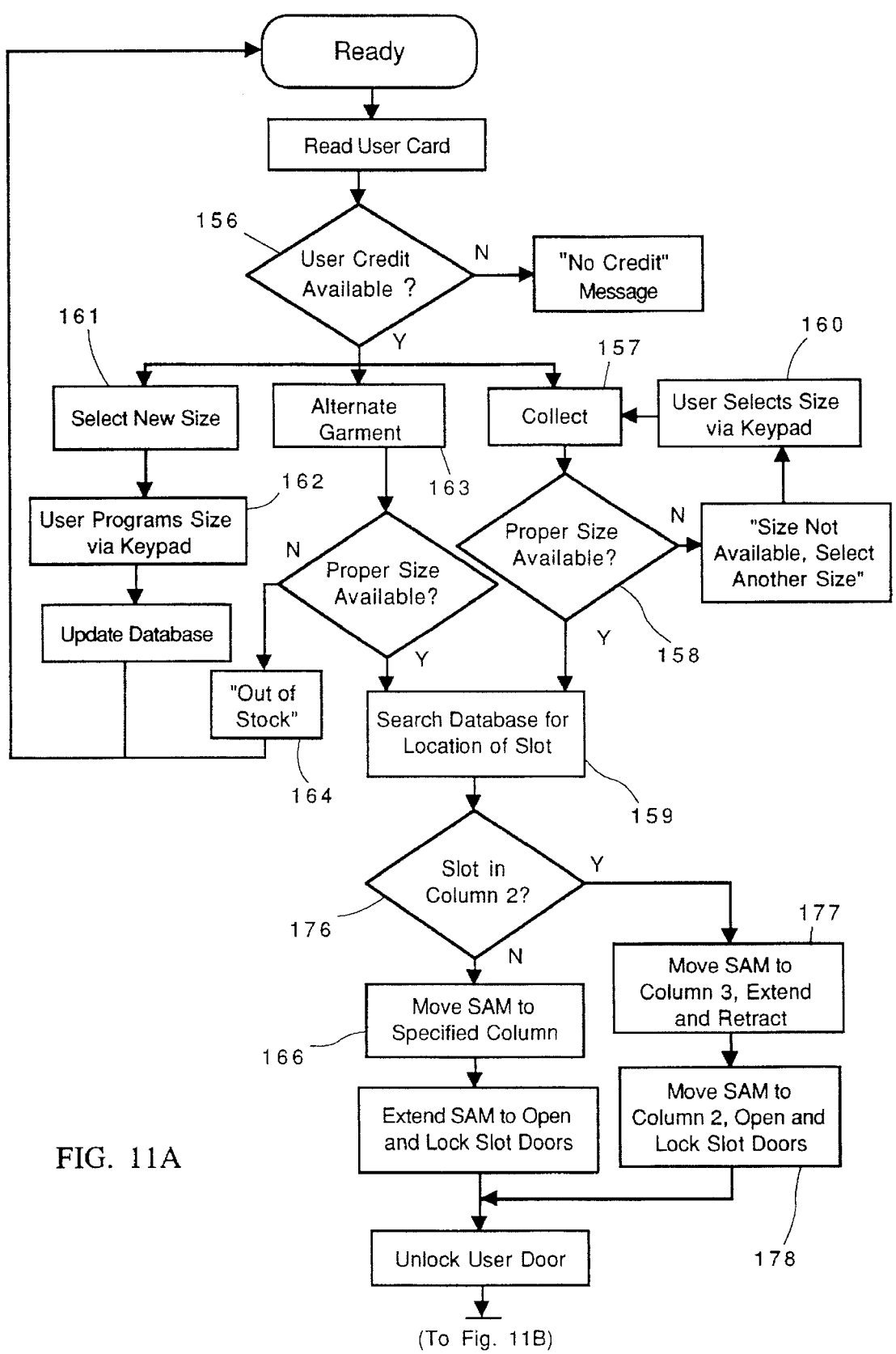
FIGS. 11A and 11B show a flow chart depicting the operation of the preferred embodiment.
Figure 11B:
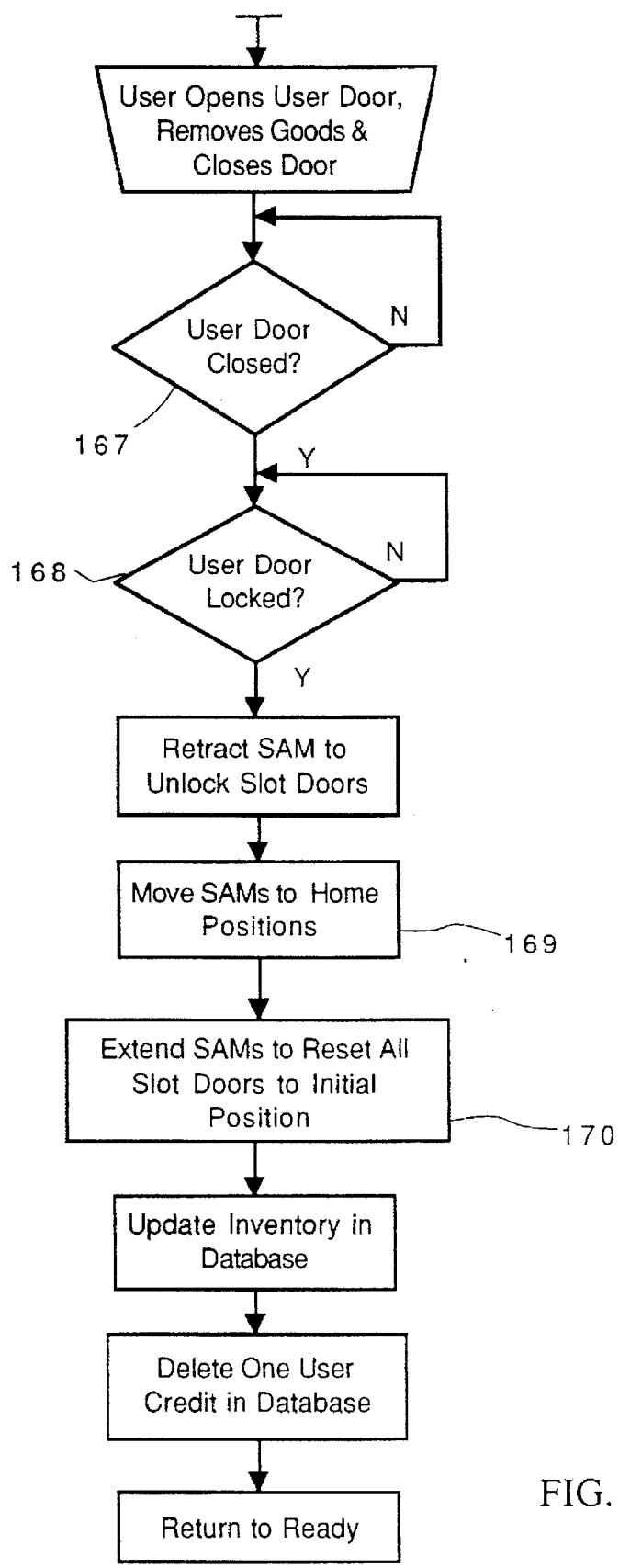

The operation of the preferred embodiment is now described, with particular reference to the steps shown in FIGS. 11A and 11B. The following discussion assumes that a supply of scrubs is loaded into the vending machine and that each person authorized to withdraw scrubs from that machine is equipped with a user I.D. card encoded with a number unique to that person. The database in the memory 129 of the vending machine contains information including the name of that individual user and the preferred combination of scrub sizes for that user. Moreover, the database of the vending machine contains information about the user credits available to each authorized user. That user-credit information is supplied by a remote computer 154 (FIG. 9) connected to the processor 128 for updating and monitoring the vending-machine database relating to usage of the vending machine. In the preferred embodiment, the processor 128 of the particular vending machine, along with the processors of similar machines located in an institution such as a hospital or the like, are connected through a suitable network to the remote computer 154 at a central location in the institution, and to the processors of each other scrub vending machine. A central remote computer connected to all scrub vending machines allows updating the user databases of each machine with added or deleted users or new size preferences, and collecting usage and inventory information in real time. The direct processor-to-processor connection permits each vending machine to receive updated information made available to any machine on the network, e.g., user-entered information changing that person's size preferences as discussed below, while the remote computer 154 is offline.

The user credit information stored in the memory 129 must be updated from time to time as each user returns soiled scrubs to a collection station. This updating of the credit information may be accomplished manually, that is, through entries to the processor 128 or the remote computer 154 from time to time. Alternatively, the processor 128 or the remote computer may receive information updating user credits from a scrub-receiving machine not a part of the present invention.

An authorized user initiates a typical vending operation by swiping his or her I.D. card through the card reader 31 on the vending machine. The card reader senses the information encoded on that I.D. card, and the processor 128 checks the database in memory 129 to determine whether a scrub credit is available for that particular user, as indicated at step 156 in FIG. 11A. If the memory 129 indicates that no credit remains for this user, the processor 128 causes a "No credit" message to appear on the display 33. However, if credit is available, an appropriate message appears on the display and the user is instructed to press a particular button on the keypad 32 to collect a scrub as indicated by step 157.

In response to the collection signal, the processor 128 searches the database in memory to determine whether a scrub of the proper size is currently stocked in the vending machine. That search is indicated at step 158. If the scrub is stocked, the processor then searches its database for the location of a slot 38 containing that scrub as shown at step 159. However, if step 158 determines that a scrub of the proper size was not available, the display 33 so informs and invites the user to select another size via the keypad 32. Step 160 shows this alterative selection. The processor 128 then repeats its search of the inventory database to see whether the newly-selected size is in stock.

If the user initially desires an alternate garment, such as a scrub jacket instead of the usual two-piece scrub garment, that user can enter an alternate-garment selection on the keypad 32 as shown at the step 163, instead of the collection step 157. The processor 128 then searches the database in memory to see whether that alternate selection is stocked. If not, an "Out of stock" message appears on the display 33 as indicated at step 164, and the user can make another selection. If the alternate garment is available, the processor searches the database as at 159 for the location of a slot containing that alternate garment.

If the user desires to change the scrub size information already in the database, the user presses a designated button on the keypad as at step 161. The user then enters the new size preferences in the keypad, as at step 162. The processor 128 forwards that information to the remote computer 154 and to other networked vending machines, which then update the user databases in all other connected vending machines in addition to the database in memory 129 of the preset vending machine. The user thus will receive scrubs of the new size for that person's next request, whether at this particular machine or any of the other networked machines. Once the user enters the new size, the operating program returns to ready status and the user can select a scrub.

Once the processor determines the location of a particular slot containing the requested scrub, the processor sends the drivers 137 a signal to operate the drive motor 90, moving the SAMs to the column containing that particular slot. The SAMs initially occupy a home location shown in FIG. 5, with the upper SAM 80U positioned at the first or left-most slot of the upper slot assembly and the lower SAM 80L positioned at the first or rightmost slot of the lower slot assembly. The driver 137 thus commences operating the SAM drive motor 90 to move the upper SAM 80U rightwardly and the lower SAM 80L leftwardly via the drive cable 87.

As the SAMs move in their respective directions, the slot sensor 97 detects each location slot 95 and sends a slot detection signal to the appropriate driver of the drivers 137. The driver counts the number of location slots 95 detected by the slot sensor 97, and compares that count with the known location, stored in memory, of the particular slot being accessed. When the count comparison indicates that the SAMs are positioned at the slot door 49 for that particular slot, the driver stops the SAM drive motor 90. The SAMs at this time have been moved to upper and lower columns including moved to the specified column containing the particular slot, step 166 in FIG. 11A.

With the SAMs thus positioned, the driver next operates the actuator 108 of a particular SAM 80U or 80L to extend the arms 112 toward the slot doors presently closing the particular slot. As the SAM extends those arms, the rollers 115 at the outer ends of the arms enter and engage the channels 117 of the slot doors 49a and 49b (FIGS. 7 and 8) presently closing the particular slot. Continued advancing movement of the arms 112 thus slides the slot doors 49a and 49b on the rails 50, spreading apart and locking open those slot doors at the column containing the particular slot 38 stocking a scrub of the requested size.

The advance limit switch 120 associated with the particular SAM sends the drivers 137 a signal that the slot door at the proper column is open. The processor then causes the drivers to actuate the user door solenoid 74 for the particular user door at the level containing the particular slot. The lock switch 134 for that user door signals the processor that the proper door is unlocked. The processor then tells the user which door to open, via the user display 33. The user may now open the correct user door 26a . . . 26h, remove the scrub from the particular slot exposed through the open slot door, and then close the user door. All other slots 38 on that level remain blocked by the slot door assembly 48U or 48L.

The tension springs 213 retain the user doors in the closed position. These tension springs exert force on the tension cables 209, drawing those tension cables inwardly through the cable guide bushings 215 at the ends of the user door and thereby urging the user doors to the closed position shown in FIG. 1 (except for the user door 26e). When the lock assembly 64 withdraws the actuator plate 66 from locking engagement with the user door, the spring 201 moves the lock rod 199 to the left as viewed in FIG. 4A, withdrawing the other end 202 of the lock rod from locking engagement with the door assembly 21 of the vending machine. The lock assembly 64 thus unlocks both ends of the user door, allowing the user to open a particular user door by pulling downwardly on the handle 28 attached to the front of the user door.

As the user door pivots downwardly around the axis formed by the pivot rods 194 and 195, the tension cables 209 move outwardly from the cable guide bushings 215, extending the tension springs 213 mounted within the user door. Those tension springs and the tension cables 209 thus prevent uncontrolled downward movement of the user door, and also provide a restoring force urging the user door to the closed position when the handle 28 is released. The stop collars 219 engage the guide bushings 220 to limit further downward movement of the user door, when that door is moved to the full-open position, shown in FIGS. 1 and 4C as being substantially horizontal in the disclosed embodiment.

When the lock rod 199 is released by the lock assembly 64 for leftward movement as mentioned above, the other end 202 of that locking rod disengages the user-door lock switch 134. As the user door is pivoted downwardly from its closed position, the finger 206 disengages the user-door closure switch 133, as seen in FIG. 4C.

The closure switch 133 for the particular user door signals the drivers that the door is closed. In response to that input, the drivers 137 then release the corresponding solenoid 74 and relock the user door. A signal from the door lock switch 134 associated with that door lock confirms that the user door did in fact become locked. At the same time, the closure switch 133 confirms that the user door is still closed. This is a safety feature to ensure that the SAMs do not move until the user doors are both closed and locked. These events appear as steps 167 and 168 on FIG. 11B.

The drivers now cause the SAM actuator 108 to retract the arms 112 to the position shown in FIG. 7, releasing the slot doors 49a and 49b. Those slot doors momentarily remain in their previously-opened position. When the retract limit switch 121 signals that the SAM actuator is retracted, the SAM drive motor 90 is operated in the reverse direction to return the SAMs to the home positions, step 169. Once the SAMs return home, both SAMs are operated to extend and open the spring-loaded first slot doors 53 and 59 and the adjacent second slot doors, as shown at step 170, and then to retract and wait for the next request. That step recloses the previously-opened slot doors 49a and 49b, and puts all the slot doors into a known position for the next operation. The spring-loaded first slot doors 53 and 59 are spring-loaded as previously disclosed, to ensure that the SAMs always know where those doors are when resetting the locations of the other doors to known locations, i.e., to locations closing the slots 38 associated with those doors. If either of the second slot-door switches 135 indicates that the slot door becomes displaced from the second slot after the slot doors have been reset to the initial position, the SAMs are activated to again reset the slot doors.

Because the slot doors are always open at the second slots after the SAMs return to the home position and reset the slot doors to their initial position, a different sequence is required to access a particular scrub from a slot in the second column of slots. Returning to FIG. 11A, if step 159 locates a particular slot in column 2 as indicated by a "Yes" answer at step 176, the drive motor 90 first moves the SAMs to column 3 as indicated at step 177, and then extends and retracts the arms 112 while at that column. This step opens the slot door assembly 48U or 48L at the third column, which pushes the second slot doors up against the spring-biased first slot doors 53 or 59. The SAMs then are moved to the second column as indicated by step 178, and the upper or lower SAM extends to open and lock the slot doors covering the second slot.

The vending machine 16 should be restocked with scrubs at a frequency depending on the capacity of the machine and the user demands at a particular location. To reduce the frequency and cost of restocking, the vending machine 16 may optionally be connected to a nearby separate vending machine that is mechanically like the present machine but is functionally slaved to the present machine. A slaved or satellite dispenser would lack a separate processor and memory, but would otherwise be like the vending machine as shown and described herein. In place of its own processor, the optional slaved machine would be connected by the line 181 (FIG. 9) to the processor 128 associated with the vending machine 16. That processor and its associated database in memory 129 would operate both vending machines, keeping up with the inventory remaining in each machine and directing users to open the appropriate user door of either machine after positioning the SAMs of that machine to access a particular slot containing the selected scrub.

It should now be apparent that vending machines as disclosed herein are not limited to dispensing scrubs, but can vend any discrete articles capable of being packaged or placed at slots or other receptacles within the machine. Because the articles being vended are never dropped and are not moved during the vending operation, until the user actually withdraws that article from the machine, the present machine is particularly well-adapted for vending articles, of which garments are but one example, that lack a fixed overall shape or are flexible and thus subject to damage if conveyed during a vending operation.

The slot doors 49 in the disclosed embodiment are divided into two separate assemblies 48U and 48L, as described, and a separate SAM moves the slot doors in each assembly. The disclosed embodiment uses this split arrangement because the length of slot doors that would extend over all eight levels of the slot arrays 39 might impair the movement of those slot doors. However, a vending machine having a single assembly of slot doors and a single SAM to move those slot doors is within the scope of the present invention.

The remote computer 154 may be used to compile reports concerning scrub usage throughout a hospital or other institution or at a particular vending machine, or by individual users, or in any other way that multiple fields of data can be sorted and arranged. Because the remote computer preferably is connected to each vending machine in an institution and receives frequent updates from the database in memory at each vending machine, data is available in near-real time to monitor usage and restocking needs for the vending machines.

Although the disclosed embodiment operates with slot doors one less than the slots in an array, the apparatus can be made wider to accommodate an equal number of slot doors. That increased width would provide lateral space for displacing the slot doors by the SAMs, for parting the slot doors at any particular slot.

In place of individual displaceable slot doors as disclosed above, a moveable panel having a single opening equal in width to a single slot can be substituted. By positioning that panel within the vending machine, the opening becomes aligned with a particular slot.

It should also be apparent that the foregoing relates only to a preferred embodiment of the present invention, and that numerous changes and modifications therein may be made without departing from the spirit and scope of the invention as defined in the following claims.

What is claimed is:

1. Apparatus for vending goods, comprising:
   an array of receptacles for receiving goods to be vended;
   a receptacle door comprising a plurality of moveable door segments operative to prevent access to all but a selected one of the receptacles;
   drive means associated with the receptacle door and selectively operative to position the door segments so that any selected receptacle in the array remains unblocked by the receptacle door;
   a user door normally preventing access to the receptacle door so that the receptacle door is inaccessible to a user; and
   means responsive to operation of the receptacle door to enable access through the user door to the receptacle door only after the receptacle door segments are positioned to select a particular receptacle,
   so that a user can open the user door for access to the particular receptacle selected by the receptacle door.

2. Apparatus as in claim 1, further comprising:
   a lock associated with the user door and operative to unlock the user door only after the receptacle door has selected the particular receptacle.

3. Apparatus as in claim 1, further comprising:
   memory means operative to receive and store information corresponding to the goods disposed in the receptacles;
   input means operative to receive information identifying a particular kind of goods desired to be vended; and
   processor means responsive to the memory means and the input means to look up from memory the location of a particular receptacle containing the particular goods and operative to cause the receptacle door to permit access to that particular receptacle.

4. Apparatus for vending goods, comprising:
   an array of receptacles for receiving goods to be vended;

a receptacle door comprising a plurality of door segments numbering one less than the number of receptacles in the array, so that the door segments prevent access to all but one selected receptacle;

drive means associated with the receptacle door for operating that door to select any particular receptacle, the drive means being selectively operative to position the door segments so that any particular receptacle remains unblocked by the receptacle door;

a user door normally preventing access to the receptacle door so that the receptacle door is inaccessible to a user; and means responsive to operation of the receptacle door to enable access through the user door to the receptacle door only after the receptacle door has selected a particular receptacle, so that a user can open the user door for access to the particular receptacle selected by the receptacle door.

5. Apparatus as in claim 4, wherein:

the door segments are supported for displacement along a path adjacent to the array of receptacles such that any segment can be displaced on the path to allow access to a particular receptacle; and the drive means includes an access means selectively moveable along the path in operative relation to a location to a particular receptacle, and operative to engage and displace at least one door segment from blocking relation to that receptacle.

6. Apparatus as in claim 5, wherein:

the door segments are supported for sliding movement along said path; and the access means comprises means operative to engage and spread apart the receptacle door segments blocking access to the particular receptacle whereat the access means is positioned.

7. Apparatus as in claim 5, further comprising:

means responsive to the movement of the access means to determine displacement of the access means relative to a predetermined home location; and means responsive to said displacement and operative in response to closure of the receptacle door to return the access means to the home location at the completion of a vending operation.

8. Apparatus for vending goods, comprising:

an array of receptacles for receiving goods to be vended;

a receptacle door comprising a plurality of moveable door segments operative to prevent access to all but a selected one of the receptacles;

drive means associated with the receptacle door for operating that door to select any particular receptacle;

a user door normally preventing access to the receptacle door so that the receptacle door is inaccessible to a user;

means responsive to operation of the receptacle door to enable access through the user door to the receptacle door only after the receptacle door has selected a particular receptacle;

the receptacle door comprising a plurality of door segments supported for displacement along a path parallel to the array and numbering one less than the number of receptacles in the array, so that the door segments are displaceable on the path to allow access to any selected receptacle while blocking access to the remaining receptacles;

the drive means comprising a carriage selectively moveable adjacent the door segments to a plurality of positions corresponding to the receptacles; and segment engagement means moveable with the carriage in a retracted position retracted from the door segments and selectively extendable at any such position to engage the door segments blocking the receptacle and separate the engaged door segments, thereby unblocking access to the corresponding receptacle, so that a user can open the user door for access to the particular receptacle selected by the receptacle door.

9. Apparatus as in claim 8, wherein:

the door segment at a predetermined receptacle location corresponding to a home location of the array is biased to a certain position so that the position of that door segment is always known when the segment engagement means is retracted; and the carriage is operative to return to the home location in response to completion of a vending operation, so that the location of the carriage is known when the next vending operation commences.

10. Apparatus as in claim 9, wherein:

the segment engagement means is operative, in response to returning the carriage to the home location, to extend and engage the door segments at that location, thereby placing all door segments in a known position for the next vending operation.

11. Apparatus as in claim 8, wherein:

the segment engagement means comprises a pair of arms operative to engage the door segments blocking the receptacle and to displace those door segments.

12. Apparatus as in claim 11, wherein:

the segment engagement means, in extending from the retracted position, is operative to travel substantially perpendicular to the path of displacement of the door segments; and the arms of the segment engagement means engage the door segments at an angle to the perpendicular travel so as to impart to the door segments a force urging the door segments for displacement along said path.

13. Apparatus for vending goods, comprising:

an array of receptacles for receiving goods to be vended;

a receptacle door operative to prevent access to all but a selected one of the receptacles;

drive means associated with the receptacle door for operating that door to select any particular receptacle;

a user door normally preventing access to the receptacle door so that the receptacle door is inaccessible to a user;

means responsive to operation of the receptacle door to enable access to the receptacle door only after the receptacle door has selected a particular receptacle;

the array of receptacles being one of plural such arrays, with each array located in a predetermined relation to the other arrays;

the receptacle door being operative to prevent access to all but a selected receptacle of each array;

the user door being one of plural user doors each operative to prevent access to the receptacle door at a corresponding array of receptacles; and the means to enable access being operative to enable access only to a selected user door at a particular array, after the receptacle door has selected a particular receptacle, so that a user can open only the selected user door and thus access only the particular receptacle for the array corresponding to that user door.

14. Apparatus for vending goods, comprising:

plural arrays of receptacles for receiving goods to be vended;

the arrays being mutually parallel and separated from each other along a dimension perpendicular to each array so that receptacles of each array are juxtaposed with receptacles of an adjacent array;

a receptacle door comprising a plurality of door segments numbering one less than the number of receptacles in an array, with each door segment extending across plural arrays so that the door segments prevent access to all but a selected juxtaposed receptacle in each array;

drive means associated with the receptacle door and selectively operative to position the door segments so that any particular juxtaposed receptacle is unblocked by the receptacle door, plural user doors each operative to prevent access to the receptacle door at a corresponding array of receptacles so that the receptacle door normally is inaccessible to a user; and means responsive to operation of the receptacle doors to enable access to only a selected user door after the receptacle door has selected a particular receptacle;

so that a user can open only the selected user door for access only to the particular receptacle selected by the receptacle door for the array corresponding to that user door.

15. Apparatus for vending goods, comprising:

plural arrays of receptacles for receiving goods to be vended, each array located in a predetermined relation to at least one other array so that the receptacles of each array are juxtaposed in predetermined relation with receptacles of another array;

receptacle door means associated with the arrays of receptacles and selectively operative to prevent access to all but a selected receptacle of each array;

plural user doors associated with the arrays of receptacles, each user door being operative to prevent access to the receptacle door means at a corresponding array of receptacles; and means responsive to operation of the receptacle door means to enable access only to a selected user door corresponding to a particular array, so that a user can open only the selected user door and thus access only the selected receptacle of the array corresponding to that user door.

16. Apparatus as in claim 15, wherein:

the plural arrays are mutually parallel and are separated from each other in laterally spaced relation to an adjacent array, so that receptacles of each array are juxtaposed in predetermined relation with receptacles of an adjacent array;

the receptacle door means defines an opening extending across several arrays and preventing access to all but a single juxtaposed receptacle in each of the several arrays; and further comprising drive means selectively operative to position the receptacle door means so that the opening permits access only to a selected juxtaposed receptacle in each of the several arrays, so that the user can access the selected receptacle for a particular one of the several arrays as the means enables access to the user door corresponding to that particular array.

17. Apparatus as in claims 16, wherein:

the opening defined by the receptacle door means extends substantially orthogonally to the several arrays.

18. Apparatus as in claim 15, wherein:

the plural arrays are mutually parallel and separated from each other along a dimension perpendicular to each array, so that receptacles of each array are juxtaposed in a predetermined relation to receptacles of an adjacent array;

the receptacle door means comprises a plurality of door segments extending across several arrays and selectively positionable to define an opening extending across the several arrays and preventing access to all but a single juxtaposed receptacle in each array; and further comprising drive means selectively operative to position the door segments so that said opening unblocks access to the selected juxtaposed receptacle in the several arrays, whereby only a single receptacle is unblocked by the receptacle door means.

* * * * *